United States Patent
Murgai et al.

(10) Patent No.: US 12,355,632 B2
(45) Date of Patent: Jul. 8, 2025

(54) DYNAMIC FREQUENCY SCALING OF MULTI-CORE PROCESSOR IN WIRELESS COMMUNICATION NETWORKS

(71) Applicant: Samsung Electronics Co., Ltd., Suwon-si (KR)

(72) Inventors: Vishal Murgai, Bangalore (IN); Swaraj Kumar, Bangalore (IN); Srihari Das Sunkada Gopinath, Bangalore (IN); Gihyun Kim, Suwon-si (KR); Hyunho Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 17 days.

(21) Appl. No.: 18/434,938

(22) Filed: Feb. 7, 2024

(65) Prior Publication Data

US 2024/0291725 A1    Aug. 29, 2024

Related U.S. Application Data

(63) Continuation of application No. PCT/KR2024/001606, filed on Feb. 2, 2024.

(30) Foreign Application Priority Data

Feb. 24, 2023  (IN) .............................. 202341012765
Nov. 29, 2023  (IN) .............................. 202341012765

(51) Int. Cl.
*H04L 41/147*    (2022.01)
*G06N 5/022*    (2023.01)
*H04L 41/16*    (2022.01)

(52) U.S. Cl.
CPC ........... *H04L 41/147* (2013.01); *G06N 5/022* (2013.01); *H04L 41/16* (2013.01)

(58) Field of Classification Search
CPC ....... H04L 41/147; H04L 41/16; G06N 5/022; G06N 20/00
See application file for complete search history.

(56) References Cited

U.S. PATENT DOCUMENTS 10,542,488 B1 *   1/2020  Marupaduga ........ H04B 7/0693
12,124,883 B2 *  10/2024  Wang .................... G06F 1/3206
(Continued)

FOREIGN PATENT DOCUMENTS

WO   WO-2022036712 A1 *  2/2022  ............. G06F 1/206
WO   WO-2023063802 A1 *  4/2023  ............. G06N 20/00

OTHER PUBLICATIONS

Search Report and Written Opinion dated May 2, 2024 issued in International Patent Application No. PCT/KR2024/001606.
(Continued)

*Primary Examiner* — Philip C Lee
(74) *Attorney, Agent, or Firm* — Nixon & Vanderhye, P.C.

(57) ABSTRACT

The disclosure describes a method and system for dynamic frequency scaling of multi-core processor in wireless communication networks. The method comprising: transmitting, by a network node (NN), core-load data and a plurality of key indicators of each core group of a plurality of core groups in the multi-core processor to a central management entity (CME); receiving, by the NN, a core-load prediction model associated for each core group from the CME; determining, by the NN, an estimated core-load data for each core group using the associated core-load prediction model and determining, by the NN, a maximum estimated core-load data among the estimated core-load data of each core group; and determining, by the NN, an optimum multi-core processor frequency for the network node based on the maximum estimated core-load data.

20 Claims, 6 Drawing Sheets

(56) References Cited

U.S. PATENT DOCUMENTS

| | | | |
|---|---|---|---|
| 12,137,414 B2* | 11/2024 | Subramaniam | H04W 24/02 |
| 2017/0031416 A1* | 2/2017 | Birke | G06F 1/324 |
| 2017/0371394 A1* | 12/2017 | Chan | G06F 1/3218 |
| 2018/0364782 A1 | 12/2018 | Piga et al. | |
| 2019/0243691 A1 | 8/2019 | LaBute et al. | |
| 2019/0272002 A1* | 9/2019 | Seenappa | G06F 1/324 |
| 2019/0325370 A1 | 10/2019 | Das et al. | |
| 2020/0403930 A1 | 12/2020 | Das et al. | |
| 2021/0357255 A1 | 11/2021 | Mahadik et al. | |
| 2022/0018890 A1 | 1/2022 | Ryu et al. | |
| 2023/0110930 A1* | 4/2023 | Kothiwale | G06F 9/5094 718/105 |
| 2023/0118253 A1* | 4/2023 | Murgai | H04L 41/149 370/318 |

OTHER PUBLICATIONS

Bao et al., "Static and Dynamic Frequency Scaling on Multicore CPUs", ACM Transactions onArchitecture and Code Optimization, vol. 13, Issue 4, Dec. 28, 2016, 26 pages.

Chen et al., "Learning-Directed Dynamic Voltage and Frequency Scaling Scheme with Adjustable Performance for Single-Core and Multi-Core Embedded and Mobile Systems", Sensors 2018, 18(9), Sep. 12, 2018, 25 pages.

Fan et al., "Predictable GPUs Frequency Scaling for Energy and Performance", In48th International Conference on Parallel Processing (ICPP 2019), Aug. 8, 2019, 11 pages.

* cited by examiner

DYNAMIC FREQUENCY SCALING OF MULTI-CORE PROCESSOR IN WIRELESS COMMUNICATION NETWORKS

CROSS-REFERENCE TO RELATED APPLICATIONS

This application is a continuation of International Application No. PCT/KR2024/001606 designating the United States, filed on Feb. 2, 2024, in the Korean Intellectual Property Receiving Office and claiming priority to Indian Provisional Patent Application No. 202341012765, filed on Feb. 24, 2023, in the Indian Patent Office, and to Indian Complete Patent Application No. 202341012765, filed on Nov. 29, 2023, in the Indian Patent Office, the disclosures of each of which are incorporated by reference herein in their entireties.

BACKGROUND

Field

The disclosure relates to network load management by dynamic frequency scaling of a multi-core processor in a wireless communication network.

Description of Related Art

In a wireless communication network, a base station consumes a lot of energy. The traffic pattern at a base station is not constant e.g., there are peak hours and off-peak hours. During off-peak hours, the traffic is lower and hence, the base station does not need to run at a maximum processor frequency. The base station running at the maximum processor frequency all the time results in inefficient energy utilization.

The information disclosed in this background of the disclosure section is simply for enhancement of understanding of the general background of the disclosure and should not be taken as an acknowledgement or any form of suggestion that this information forms the prior art already known to a person skilled in the art.

SUMMARY

In an example embodiment, the disclosure relates to a method for dynamic frequency scaling of a multi-core processor in a wireless communication network. The method comprising: transmitting, by a network node (NN), core-load data and a plurality of key indicators of each core group of a plurality of core groups in the multi-core processor to a central management entity (CME; receiving, by the NN, a core-load prediction model associated for the each core group from the CME in response to the transmission, the core-lode prediction model being determined based on the core-load data and the plurality of key indicators of the each core group; determining, by the NN, an estimated core-load data for the each core group based on the plurality of key indicators of each core group using the associated core-load prediction model and determining, by the NN, a maximum estimated core-load data among the estimated core-load data of each core group; and determining, by the NN, an multi-core processor frequency for the network node based on the maximum estimated core-load data.

In an example embodiment, the disclosure relates to a network node for dynamic frequency scaling of a multi-core processor in a wireless communication network. The the NN comprises at least one processor, comprising processing circuitry, and a memory communicatively coupled to the processor. The NN is configured to: transmit core-load data and a plurality of key indicators of each core group of a plurality of core groups in the multi-core processor to a central management entity (CME; receive a core-load prediction model associated for each core group from the CME in response to the transmission, the core-lode prediction model being determined based on the core-load data and the plurality of key indicators of the each core group; determine an estimated core-load data for the each core group based on the plurality of key indicators of each core group using the associated core-load prediction model and determine a maximum estimated core-load data among the estimated core-load data of each core group; and determine a multi-core processor frequency for the network node based on the maximum estimated core-load data.

In an example embodiment, the disclosure relates to one or more non-transitory computer-readable storage media storing computer-executable instructions that, when executed by at least one processor of a network node, cause the network node to perform operations. The operations comprises transmit core-load data and a plurality of key indicators of each core group of a plurality of core groups in the multi-core processor to a central management entity (CME); receive a core-load prediction model associated for the each core group from the CME in response to the transmission, the core-lode prediction model being determined based on the core-load data and the plurality of key indicators of the each core group; determine an estimated core-load data for the each core group based on the plurality of key indicators of each core group using the associated core-load prediction model; determine a maximum estimated core-load data among the estimated core-load data of each core group; and determine a multi-core processor frequency for the network node based on the maximum estimated core-load data.

The foregoing summary is merely illustrative and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and are a part of this disclosure, illustrate various example embodiments and together with the description, serve to explain the disclosed principles. The same reference numbers may be used throughout the figures to reference like features and components. The above and other aspects, features and advantages of certain embodiments of the disclosure will be more apparent from the following detailed description, taken in conjunction with the accompanying drawings, in which.

Figure 1:
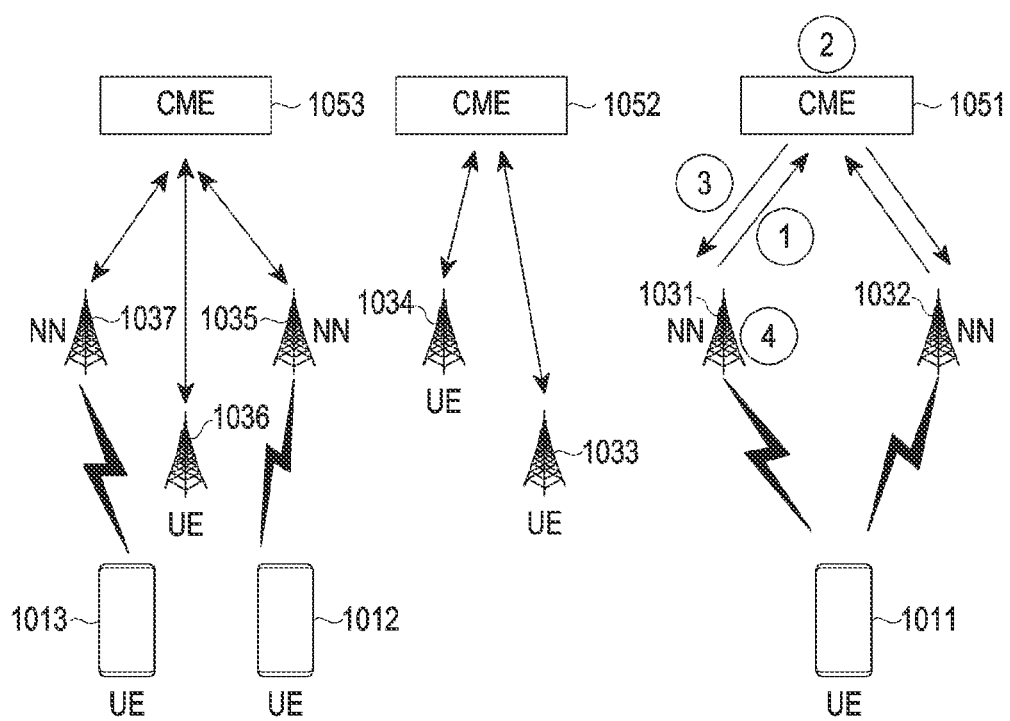
FIG. 1 is a diagram illustrating an environment for dynamic frequency scaling of a multi-core processor in a wireless communication network according to various embodiments.

It should be appreciated by those skilled in the art that any block diagrams herein represent conceptual views of illustrative systems embodying the principles of the disclosure. Similarly, it will be appreciated that any flowcharts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the disclosure, the word "exemplary" is used herein to refer, for example, to "serving as an example, instance, or illustration." Any embodiment or implementation of the disclosure described herein as "exemplary" is not necessarily to be construed as preferred or advantageous over other embodiments.

While the disclosure is susceptible to various modifications and alternative forms, various example embodiments are shown by way of example in the drawings and will be described in greater detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description, reference is made to the accompanying drawings that form a part hereof, and in which are shown by way of illustration various example embodiments in which the disclosure may be practiced. These embodiments are described in sufficient detail to enable those skilled in the art to practice the disclosure, and it is to be understood that various embodiments may be utilized and that changes may be made without departing from the scope of the disclosure. The following description is, therefore, not to be taken in a limiting sense.

TABLE 1

| Abbreviation | Description |
| --- | --- |
| 6G | Sixth Generation cellular network technology |
| 3G | Third Generation cellular network technology |
| 5G | Fifth Generation cellular network technology |
| UE | User Equipment |
| NR | New Radio |
| UL | Uplink |
| DL | Downlink |
| eNodeB or eNB | evolved Node B |
| gNodeB or gNB | next generation Node B |
| KIs | Key Indicators |
| DU | Distributed Unit |
| NN | Network Node |
| CME | Central Management Entity |
| CPU | Central Processing Unit |
| RRC | Radio Resource Control |
| RLC | Radio Link Control |
| PDCP | Packet Data Convergence Protocol |
| IP | Internet Protocol |
| I-O interface | Input/Output interface |
| CDMA | Code-Division Multiple Access |
| HSPA+ | High-Speed Packet Access |
| GSM | Global System for Mobile communications |
| LTE | Long-Term Evolution |
| WiMax | Worldwide interoperability for Microwave access |
| RAID | Redundant Array of Independent Discs |
| ASIC | Application Specific Integrated Circuit |
| FPGA | Field-Programmable Gate Arrays |
| PGA | Programmable Gate Array |
| ASIC | Application Specific Integrated Circuit |
| RAM | Random Access Memory |
| ROM | Read-Only Memory |
| NG | Next Generation |
| GHz | Gigahertz |
| NSA-DC | Network Spike Anomaly Detection and Correction |
| ML | Machine Learning |
| RL | Reinforcement Learning |

FIG. 1 is a diagram illustrating an environment for dynamic frequency scaling of a multi-core processor in a wireless communication network according to various embodiments.

With reference to FIG. 1, the environment comprises of a plurality of UEs 1011, 1012, 1013, a plurality of NNs 1031 to 1037, and a plurality of CMEs 1051, 1052, 1053. In an embodiment, only one or more NNs are part of a system. In an embodiment, the one or more NNs, and one or more CMEs are part of the system. Each of the plurality of UEs 1011, 1012, 1013 may, also, be referred as a mobile terminal, or a user terminal. Each of the plurality of NNs 1031 to 1037 may, also, be referred as a node B, an eNodeB, an eNB, a gNodeB, a gNB, or DU. In a non-limiting example, the plurality of UEs 1011, 1012, 1013 comprise a UE 1011, a UE 1012, and a UE 1013. In a non-limiting example, the plurality of NNs 1031 to 1037 comprise a NN 1031, a NN 1032, a NN 1033, a NN 1034, a NN 1035, a NN 1036, and a NN 1037. In a non-limiting example, the plurality of CMEs 1051, 1052, 1053 comprise a CME 1051, a CME 1052, and a CME 1053. For sake of explanation, consider that the UE 1011 may communicate with at least one of the NN 1031 or the NN 1032. The NN 1031 and that the NN 1032 communicates with the CME 1051. The NN 1033 and the NN 1034 may communicate with the CME 1052. The UE 1012 may communicate with the NN 1035, and the UE 1013 may communicate with the NN 1037. The NN 1035, the NN 1036, and the NN 1037 may communicate with the CME 1053. Each NN of the plurality of NNs 1031 to 1037 comprises a multi-core processor (not shown in FIG. 1) comprising various processing circuitry. The multi-core processor comprises a plurality of core groups. Further, each CPU core group of the plurality of core groups comprises of one or more processor cores used by an application.

An operation for dynamic frequency scaling of a multi-core processor in a wireless communication network is explained in greater detail below with reference to FIG. 1.

The NN 1031 transmits core-load data and a plurality of key indicators of each core group of a plurality of core groups in the multi-core processor to the CME 1051. The key indicators comprise, but not limited to, average core-load data, individual core-load data, a downlink throughput data, an uplink throughput data, an average downlink throughput data, and an average uplink throughput data. The CME 1051 receives the core-load data and the plurality of key indicators of each core group of the plurality of core groups from the NN 1031. The CME 1051 determines associated one or more key indicators from the plurality of key indicators of each core group of the plurality of core groups for predicting future core-load data in the multi-core processor. The CME 1051 may use a feature selection technique in machine learning to determine associated one or more key indicators from the plurality of key indicators of each core group of the plurality of core groups for predicting future core-load data of the core-group in the multi-core processor. The feature selection technique is based on, but not limited to, one of a statistical correlation model, a spearman rank correlation technique, a Boruta function, and a neural architecture search technique. The associated one or more key indicators of each core group of the plurality of core groups may be different for each application. The CME 1051 determines/arrives at core-load prediction model for the each core group based on the associated one or more key indicators. The CME 1051 learns relationship between the future core-load data for the each core group of the plurality of core groups and the associated one or more key indicators to build the core-load prediction model associated for each core group using a machine learning technique. The core-load prediction model is based on, but not limited to, machine learning techniques like, Q-learning technique, RL technique, or an actor critic algorithm. Once the core-load prediction model is built/ready, the CME 1051 transmits the core-load prediction model of the each core group to the NN 1031. This approach of building of the core-load prediction model of the each core group at the CME 1051 (instead of building at the NN 1031) and transmitting the core-load prediction model to the NN 1031 significantly reduces processing at the NN 1031.

The NN 1031 receives the core-load prediction model associated for each core group from the CME 1051 in response to the transmission. The NN 1031 trains a core-load and frequency relationship model to be utilized to increase a current processor (e.g., multi-core processor) frequency to an optimum frequency for which the estimated core-load data becomes less than an upper threshold limit, when the estimated core-load data is above the upper threshold limit and to decrease the current processor frequency to the optimum frequency for which the estimated core-load data remains less than the upper threshold limit, when the estimated core-load data is below a lower threshold limit. The upper threshold limit (also, referred as high core-load threshold) and the lower threshold limit (also, referred as low core-load threshold) are either pre-determined (e.g., specified) values as per industry standard or set by a telecommunication operator. In an example, non-limiting example embodiment, the upper threshold limit is set to 80% of a maximum processing load value and the lower threshold limit is set to 50% of the maximum processing load value. The NN 1031 determines an estimated core-load data for each core group using the associated core-load prediction model. Thereafter, the NN 1031 determines a maximum estimated core-load data among the estimated core-load data of each core group. The NN 1031 determines an optimum multi-core processor frequency for the network node based on the maximum estimated core-load data. For example, the NN 1031 determines the optimum multi-core processor frequency for the network node based on the maximum estimated core-load data using the core-load and frequency relationship model. The core-load and frequency relationship model utilizes the maximum estimated core-load data to determine the optimum multi-core processor frequency. Using the optimum multi-core processor frequency, the NN 1031 scales a current multi-core processor frequency of the multi-core processor to the optimum multi-core processor frequency. For example, the NN 1031 scales the current multi-core processor frequency by changing the current multi-core processor frequency in steps of one frequency level each time or by changing the current multi-core processor frequency in steps of multiple frequency levels each time. The scaling the current multi-core processor frequency by changing the current multi-core processor frequency in steps of one frequency level each time may refer, for example, to a conservative mode. In the conservative mode, frequency scaling done in smaller steps (e.g., changing current frequency level to immediate next frequency level). The scaling the current multi-core processor frequency by changing the current multi-core processor frequency in steps of multiple frequency levels each time may refer, for example, to an aggressive mode. In the aggressive mode, frequency scaling is done aggressively or bigger steps (e.g., changing current frequency level to any frequency level). The frequency scaling may not be limited to just the conservative mode and the aggressive mode as more modes can be setup as per industry standard or as per telecommunication operator's requirement. In an embodiment, there may be seven levels of multi-core processor frequency for scaling e.g., 1.2 GHz, 1.3 GHz, 1.4 GHz, 1.5 GHz, 1.6 GHz, 1.7 GHz, and 1.8 GHz. For instance, if the current core-load data of the NN 1031 is 50% when the current multi-core processor frequency is 1.8 GHz, the current multi-core processor frequency is changed to the optimum multi-core processor frequency of 1.2 GHz such that the core-load data is at 70% for the same traffic scenario. This approach of dynamic frequency scaling of multi-core processor results in power saving in the range of 10 to 12% at the NN 1031 (refer FIG. 4 for details). Further, the disclosure utilizes different key indicators of each core group running different applications, identifies a core-load prediction model associated for each core group to find an estimated core-load data for each core group and a maximum estimated core-load data and determines an optimum multi-core processor frequency for core groups of the network node based on the maximum estimated core-load data. This approach allows optimum utilization of the multi-core processor frequency, which consequently adapts to the network node's (NN) load continuously.

For example, consider an example in which the NN 1031 comprises a multi-core processor with 32 processors. The multi-core processor comprises a plurality of core groups, e.g., a core group 1, a core group 2, and a core group 3. Further, each core group, e.g., the core group 1, the core group 2, and the core group 3 of the plurality of core groups comprises one or more processors e.g., processors 1 to 8, processors 9 to 24, and processors 25 to 32, respectively. In an example, assume that the core group 1 comprising processors 1 to 8 runs RLC processing functionality application (e.g., core-load prediction model may consider UL/DL throughput), the core group 2 comprising processors 9 to 24 runs PDCP/IP processing functionality application (e.g., core-load prediction model may consider number of UEs), and the core group 3 comprising processors 25 to 32 runs Linux control plane processing functionality application (e.g., core-load prediction model may consider number of control plane packets). The estimated core-load data for each core group using the associated core-load prediction model determined is 60% for the core group 1, 80% for the core group 2, and 20% for the core group 3. In this case, the NN 1031 determines a maximum estimated core-load data among the estimated core-load data of each core group, which is 80% in this case. The NN 1031 determines an optimum multi-core processor frequency based on the maximum estimated core-load data.

In a situation when the NN 1031 detects an unexpected core-load (or anomaly in core-load) in at least one of the core group of the plurality of core groups based on at least one of current core-load data, memory buffer data, and network traffic data, the NN 1031 scales a current multi-core processor frequency of the multi-core processor to a maximum multi-core processor frequency upon detecting the unexpected core-load. The NN 1031 detects the unexpected core-load when at least one of the current core-load data, the memory buffer data, and the network traffic data increase from their previous value above an associated pre-configured threshold value. Each of the current core-load data, the memory buffer data, and the network traffic data have an associated pre-configured threshold value. The associated pre-configured threshold value is either a pre-determined value as per industry standard or set by the telecommunication operator. This approach provides a safeguard or a protection against any unexpected core-load, e.g., traffic spike during operation of the NN 1031 by scaling the current multi-core processor frequency to a maximum multi-core processor frequency.

The above-mentioned operation performed by the NN 1031 for dynamic frequency scaling of a multi-core processor in a wireless communication is also applicable for each of the NNs 1032 to 1037. The above-mentioned operation performed by the CME 1051 for dynamic frequency scaling of a multi-core processor in the wireless communication is also applicable for each of the CMEs 1052, 1053.

The system and the method of the disclosure for dynamic frequency scaling of a multi-core processor in a wireless communication network is applicable to, but not limited to, 3G, LTE, 5G, and 6G wireless communication network or any multi-core network processor in general.

Figure 2A:
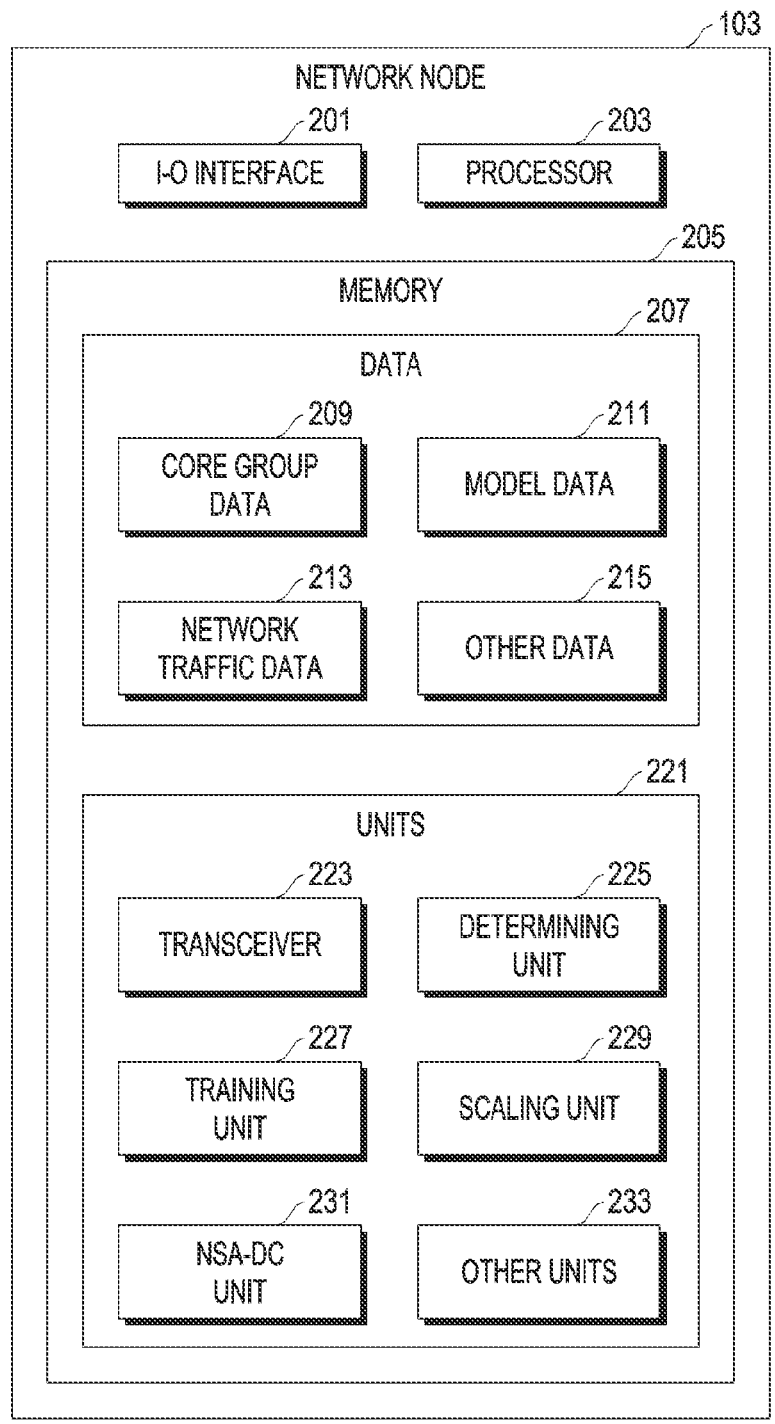
FIG. 2A is a block diagram illustrating an example configuration of a network node according to various embodiments.

FIG. 2A is a block diagram illustrating an example configuration of a network node according to various embodiments. The block diagram of NN 103 shown in FIG. 2A represents a block diagram for each of the plurality of NNs 1031 to 1037. For ease of explanation, each of the plurality of NNs 1031 to 1037 may be referred as NN 103.

The NN 103 includes an I-O interface (e.g., including I/O interface circuitry) 201, a processor (e.g., including processing circuitry) 203, data 207, a memory 205 and one or more units 221 (also, referred as units), which are described herein in greater detail. Each of the units may include various circuitry and/or executable program instructions.

The NN 103 communicates with the associated CME 105 via the I-O interface 201. The I-O interface 201 employs communication protocols or methods such as, without limitation, Bluetooth, cellular e.g., CDMA, HSPA+, GSM, LTE, NR, WiMax, NG interface, or the like.

The processor 203 may include at least one data processor for dynamic frequency scaling of a multi-core processor in a wireless communication network. The processor 203 may include specialized processing units such as, without limitation, integrated system (bus) controllers, memory management control units, floating point units, graphics processing units, digital signal processing units, etc. The processor 203 according to an embodiment of the disclosure may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

In an embodiment, the data 207 is stored within a memory 205. The memory 205 is communicatively coupled to the processor 203 of the NN 103. The memory 205, also, stores processor instructions which, when executed, may cause the processor 203 to execute the instructions for dynamic frequency scaling of a multi-core processor in the wireless communication network. The memory 205 includes, without limitation, memory drives, etc. The memory drives further include a drum, magnetic disc drive, magneto-optical drive, optical drive, RAID, solid-state memory devices, solid-state drives, etc.

The data 207 includes, for example, core group data 209, model data 211, network traffic data 213, and other data 215 (also, referred as miscellaneous data).

The core group data 209 stores core-load data and associated one or more key indicators of each core group of a plurality of core groups in the multi-core processor before sending to the CME 105. The key indicators comprise average core-load data, individual core-load data, a downlink throughput data, an uplink throughput data, an average downlink throughput data, and an average uplink throughput data.

The model data 211 stores the core-load prediction model associated for each core group received from the CME 105 before the NN 103 determines an estimated core-load data for each core group using the associated core-load prediction model.

The network traffic data 213 stores traffic data of the network which comprises uplink and downlink traffic, each type of traffic may further comprise different type of packets requiring different processing.

The other data 215 may store data, including temporary data and temporary files, generated by one or more units 221 for performing the various functions of the NN 103.

In an embodiment, the data 207 in the memory 205 are processed by the one or more units 221 within the memory 205 of the NN 103. The one or more units 221 may be implemented as dedicated hardware units. As used herein, the term unit may refer, for example, and without limitation, to at least one of an ASIC, an electronic circuit, a FPGA, a combinational logic circuit, and other suitable components that provide the described functionality. In some implementations, the one or more units 221 is communicatively coupled to the processor 203 for performing one or more functions of the NN 103. The one or more units 221 when configured with the functionality described in the disclosure will result in a novel hardware.

In an implementation, the one or more units 221 include, but are not limited to, a transceiver 223, a determining unit 225, a training unit 227, a scaling unit 229, and an NSA-DC unit 231. The one or more units 221 may, also, include other units 233 (also, referred as miscellaneous units) to perform various miscellaneous functionalities of the NN 103.

Transceiver 223: The transceiver 223 transmits core-load data and a plurality of key indicators of each core group of a plurality of core groups in the multi-core processor to the CME 105. The each core group of the plurality of core groups comprises of one or more processor cores used by an application. The key indicators comprise average core-load data, individual core-load data, a downlink throughput data, an uplink throughput data, an average downlink throughput data, and an average uplink throughput data. Core-load may refer, for example, to percentage of time spent by processor cores in packet processing e.g., busy period/(busy period plus idle period). Average core-load may refer, for example, to average of individual core-loads in a core-group. Average up-link and downlink traffic is average of traffics taken over fixed time period.

In response to the transmission, the transceiver 223 receives a core-load prediction model associated for each core group from the CME 105.

Determining unit 225: The determining unit 225 determines an estimated core-load data for each core group using the associated core-load prediction model.

The determining unit 225 determines a maximum estimated core-load data among the estimated core-load data of each core group.

The determining unit 225 determines an optimum multi-core processor frequency for the network node 103 based on the maximum estimated core-load data. In detail, the determining unit 225 determines the optimum multi-core processor frequency for the network node based on the maximum estimated core-load data using the core-load and frequency relationship model.

Training unit 227: The training unit 227 trains the core-load and frequency relationship model to be utilized to increase a current processor frequency to an optimum frequency for which the estimated core-load data becomes less than an upper threshold limit, when the estimated core-load data is above the upper threshold limit and to decrease the current processor frequency to the optimum frequency for which the estimated core-load data remains less than the upper threshold limit, when the estimated core-load data is below a lower threshold limit.

Scaling unit 229: The scaling unit 229 scales a current multi-core processor frequency of the multi-core processor to the optimum multi-core processor frequency. In detail, the scaling unit 229 performs the scaling of the current multi-core processor frequency by changing the current multi-core processor frequency in steps of one frequency level each time or by changing the current multi-core processor frequency in steps of multiple frequency levels each time.

The scaling unit 229 scales a current multi-core processor frequency to a maximum multi-core processor frequency upon detecting the unexpected core-load.

NSA-DC unit 231: The NSA-DC unit 231 detects an unexpected core-load in at least one of the core group of the plurality of core groups based on at least one of current core-load data, memory buffer data, and network traffic data. In detail, the NSA-DC unit 231 detects the unexpected core-load when at least one of the current core-load data, the memory buffer data, and the network traffic data increase from their previous value is above an associated pre-configured threshold value.

Figure 2B:
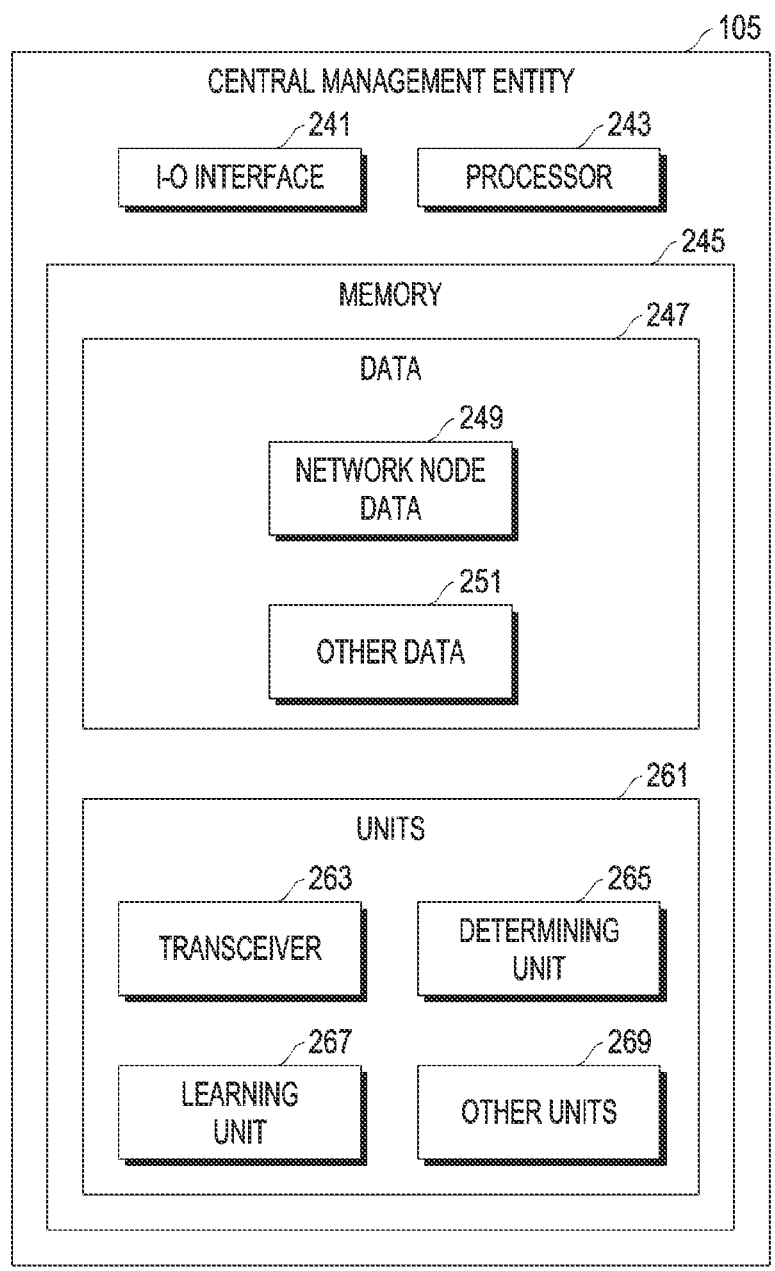
FIG. 2B is a block diagram illustrating an example configuration of a CME according to various embodiments.

FIG. 2B is a block diagram illustrating an example configuration of a central management entity according to various embodiments. The block diagram of CME 105 shown in FIG. 2B represents a block diagram for each of the plurality of CMEs 1051, 1052, 1053. For ease of explanation, each of the plurality of CMEs 1051, 1052, 1053 may be referred as CME 105.

The CME 105 includes an I-O interface (e.g., including I/O circuitry) 241, a processor (e.g., including processing circuitry) 243, data 247, a memory 245 and one or more units 261 (also, referred as units), which are described herein in greater detail. Each of the units may include various circuitry and/or executable program instructions.

The CME 105 communicates with the associated NN 103 via the I-O interface 241. The I-O interface 241 employs communication protocols or methods such as, without limitation, Bluetooth, cellular e.g., CDMA, HSPA+, GSM, LTE, NR, WiMax, NG interface, or the like.

The processor 243 may include at least one data processor for periodically training ML model to arrive at core-load prediction model. The processor 243 includes specialized processing units such as, without limitation, integrated system (bus) controllers, memory management control units, floating point units, graphics processing units, digital signal processing units, etc. The processor 243 according to an embodiment of the disclosure may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

In an embodiment, the data 247 is stored within a memory 245. The memory 245 is communicatively coupled to the processor 243 of the CME 105. The memory 245, also, stores processor instructions which train the ML model to arrive at core-load prediction model. The memory 245 includes, without limitation, memory drives, etc. The memory drives further include a drum, magnetic disc drive, magneto-optical drive, optical drive, RAID, solid-state memory devices, solid-state drives, etc.

The data 247 includes, for example, network node data 249, and other data 251 (also, referred as miscellaneous data).

The network node data 249 stores the core-load data and the plurality of key indicators of each core group of the plurality of core groups received from the NN 103 periodically. The key indicators comprise average core-load data, individual core-load data, a downlink throughput data, an uplink throughput data, an average downlink throughput data, and an average uplink throughput data.

The other data 251 may store data, including temporary data and temporary files, generated by one or more units 261 for performing the various functions of the CME 105.

In an embodiment, the data 247 in the memory 245 are processed by the one or more units 261 present within the memory 245 of the CME 105. The one or more units 261 may be implemented as dedicated hardware units. As used herein, the term unit refers to at least one of an ASIC, an electronic circuit, a FPGA, a combinational logic circuit, and other suitable components that provide the described functionality. In some implementations, the one or more units 261 is communicatively coupled to the processor 243 for performing one or more functions of the CME 105. The one or more units 261 when configured with the functionality defined in the disclosure will result in a novel hardware.

In an implementation, the one or more units 261 include, but are not limited to, a transceiver 263, a determining unit 265, and a learning unit 267. The one or more units 261 may, also, include other units 269 (also, referred as miscellaneous units) to perform various miscellaneous functionalities of the CME 105.

Transceiver 263: The transceiver 263 receives the core-load data and the plurality of key indicators of each core group of the plurality of core groups from the NN 103 periodically. The key indicators comprise average core-load data, individual core-load data, a downlink throughput data, an uplink throughput data, an average downlink throughput data, and an average uplink throughput data.

In response to the reception, the transceiver 263 transmits the core-load prediction model of the each core group to the NN 103.

Determining unit 265: The determining unit 265 determines associated one or more key indicators from the plurality of key indicators of each core group of the plurality of core groups for predicting future core-load data in the multi-core processor using a feature selection technique in machine learning.

Learning unit 267: The learning unit 267 learns relationship between the future core-load data for the each core group of the plurality of core groups and the associated one or more key indicators to build the core-load prediction model associated for each core group. The core-load prediction model is based on, but not limited to, machine learning techniques like, Q-learning technique, RL technique, or an actor critic algorithm.

Figure 3A:
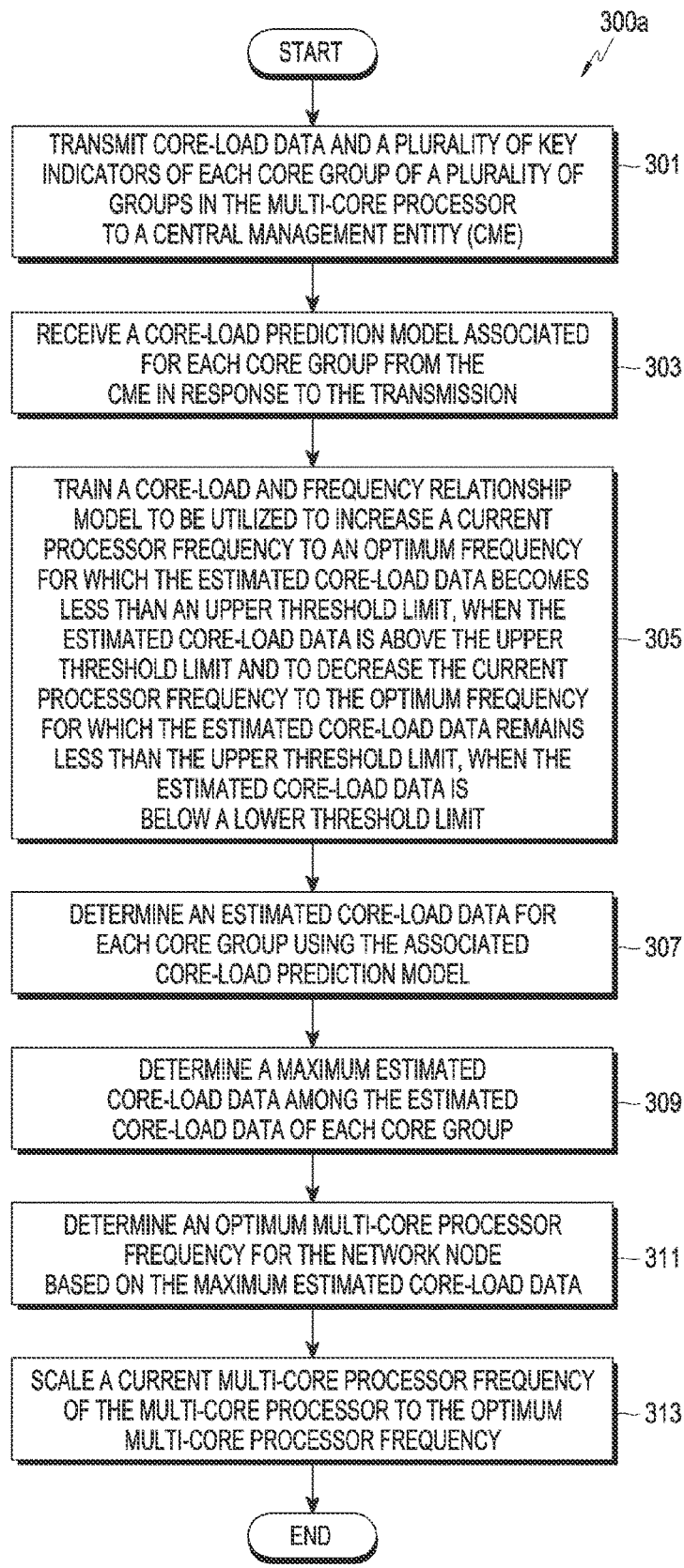
FIGS. 3A and 3B are flowcharts illustrating an example method for dynamic frequency scaling of a multi-core processor in a wireless communication network according to various embodiments.
Figure 3B:
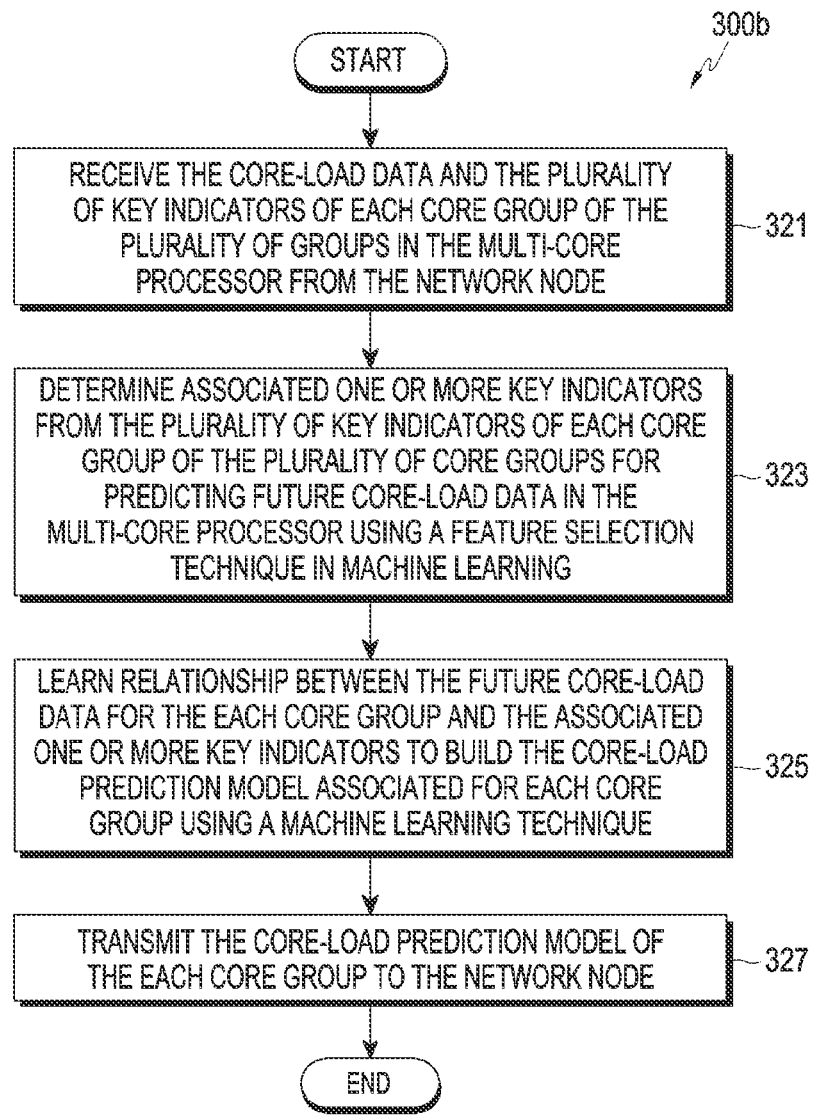

FIGS. 3A and 3B are flowcharts illustrating an example method for dynamic frequency scaling of a multi-core processor in a wireless communication network according to various embodiments.

As illustrated in FIGS. 3A and 3B, the method 300a and method 300b include one or more operations or steps for dynamic frequency scaling of a multi-core processor in a wireless communication network in accordance with various embodiments of the disclosure. The method 300a and method 300b may be described in the general context of computer executable instructions. Generally, computer executable instructions may include routines, programs, objects, components, data structures, procedures, modules, and functions, which perform particular functions or implement particular abstract data types.

The order in which the method 300a and method 300b is described is not intended to be construed as a limitation, and any number of the described method operation steps can be combined in any order to implement the method. Additionally, individual operation steps may be deleted from the methods without departing from the scope of the subject matter described herein.

Furthermore, the method can be implemented in any suitable hardware, software, firmware, or combination thereof.

With reference to FIG. 3A, the following operations or steps may be performed by the network node 103.

At operation 301, the transceiver 223 of the network node 103 transmits core-load data and a plurality of key indicators of each core group of a plurality of core groups in the multi-core processor to the CME 105 periodically. The each core group of the plurality of core groups comprises of one or more processor cores used by an application. The key indicators comprise average core-load data, individual core-load data, a downlink throughput data, an uplink throughput data, an average downlink throughput data, and an average uplink throughput data.

At operation 303, the transceiver 223 of the network node 103 receives a core-load prediction model associated for each core group from the CME in response to the transmission.

At operation 305, the training unit 227 of the network node 103 trains a core-load and frequency relationship model to be utilized to increase a current processor frequency to an optimum frequency for which the estimated core-load data becomes less than an upper threshold limit, when the estimated core-load data is above the upper threshold limit and to decrease the current processor frequency to the optimum frequency for which the estimated core-load data remains less than the upper threshold limit, when the estimated core-load data is below a lower threshold limit.

At operation 307, the determining unit 225 of the network node 103 determines an estimated core-load data for each core group using the associated core-load prediction model.

At operation 309, the determining unit 225 of the network node 103 determines a maximum estimated core-load data among the estimated core-load data of each core group.

At operation 311, the determining unit 225 of the network node 103 determines an optimum multi-core processor frequency for the network node based on the maximum estimated core-load data. In detail, the determining unit 225 determines the optimum multi-core processor frequency for the network node based on the maximum estimated core-load data using the core-load and frequency relationship model.

At operation 313, the scaling unit 229 of the network node 103 scales a current multi-core processor frequency of the multi-core processor to the optimum multi-core processor frequency. The scaling the current multi-core processor frequency is performed by changing the current multi-core processor frequency in steps of one frequency level each time or by changing the current multi-core processor frequency in steps of multiple frequency levels each time.

With reference to FIG. 3B, the following operations or steps are performed by the central management entity 105.

At operation 321, the transceiver 263 of the central management entity 105 receives the core-load data and the plurality of key indicators of each core group of the plurality of core groups in the multi-core processor from the network node 103.

At operation 323, the determining unit 265 of the central management entity 105 determines associated one or more key indicators from the plurality of key indicators of each core group of the plurality of core groups for predicting future core-load data in the multi-core processor using a feature selection technique in machine learning.

At operation 325, the learning unit 267 of the central management entity 105 learns a relationship between the future core-load data for the each core group of the plurality of core groups and the associated one or more key indicators to build the core-load prediction model associated for each core group using a machine learning technique.

At operation 327, the transceiver 263 of the central management entity 105 transmits the core-load prediction model of the each core group to the network node 103.

Figure 4:
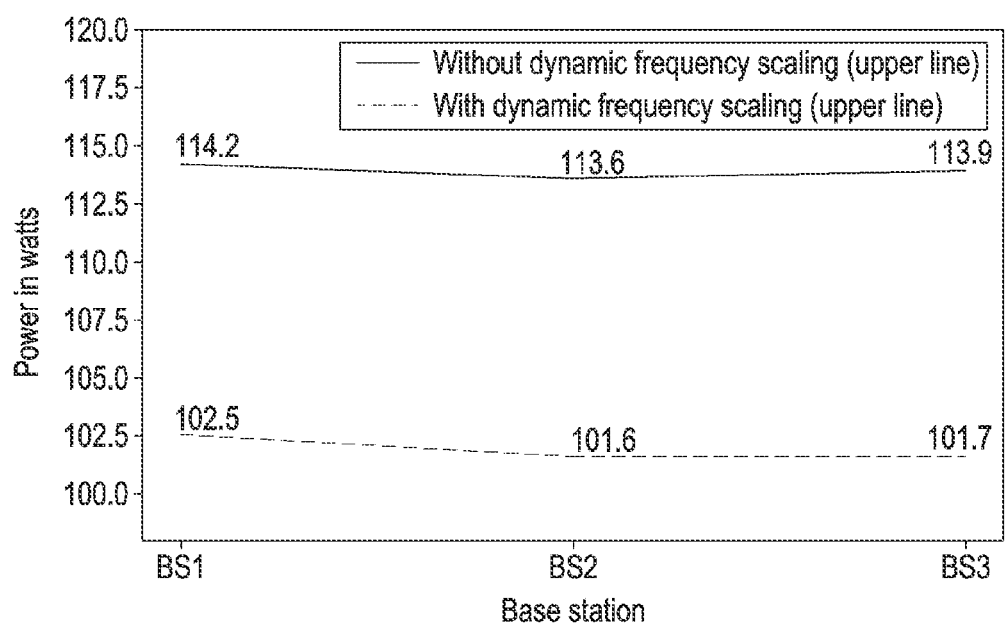
FIG. 4 is a graph illustrating an experimental result without and with dynamic frequency scaling of a multi-core processor according to various embodiments.

FIG. 4 is a graph illustrating an experimental result in terms of power saving in absence and in presence of dynamic frequency scaling of CPU according to various embodiments.

In FIG. 4, x-axis refers to base stations BS1, BS2, BS3 and y-axis refers to power consumed by the base stations BS1, BS2, BS3. In the absence of dynamic frequency scaling of CPU of the disclosure, the base stations BS1, BS2, BS3 consume between 113 and 115 watts of power. With the implementation of dynamic frequency scaling of CPU of the disclosure, the base stations BS1, BS2, BS3 consume between 101 and 103 watts of power, which results in power saving in the range of 10 to 12% across the base stations BS1, BS2, BS3.

Some example advantages of the disclosure are listed below.

Multi-core processor have core groups for executing different applications. The disclosure utilizes different key indicators of each core group running different applications, identifies a core-load prediction model associated for each core group to find an estimated core-load data for each core group and a maximum estimated core-load data and determines an optimum multi-core processor frequency for core groups of the network node based on the maximum estimated core-load data. This approach allows optimum utilization of the multi-core processor frequency, which consequently balances processor load continuously.

With reference to FIG. 4, the dynamic frequency scaling of a multi-core processor according to various embodiments may result in power savings in the range of 10 to 12% across network nodes.

The building of the core-load prediction model at CME (instead of building at a network node) and transmitting the core-load prediction model to the network node significantly reduces processing at the network node.

The disclosure provides a safeguard against any unexpected core-load e.g., traffic spike during operation of a network node by scaling a current multi-core processor frequency of the multi-core processor to a maximum multi-core processor frequency.

according to various example embodiments, a method for dynamic frequency scaling of a multi-core processor in a wireless communication network, may comprise:
transmitting core-load data and a plurality of key indicators of each core group of a plurality of core groups in the multi-core processor to a central management entity (CME);
receiving a core-load prediction model associated for each core group from the CME in response to the transmission;
determining an estimated core-load data for each core group using the associated core-load prediction model;
determining a maximum estimated core-load data among the estimated core-load data of each core group; and
determining an optimum multi-core processor frequency for the network node based on the maximum estimated core-load data.

According to an example embodiment, the method may further comprise:
receiving the core-load data and the plurality of key indicators of each core group of the plurality of core groups in the multi-core processor from the network node;
determining associated one or more key indicators from the plurality of key indicators of each core group of the plurality of core groups for predicting future core-load data in the multi-core processor using a feature selection technique in machine learning;
learning relationship between the future core-load data for the each core group of the plurality of core groups and the associated one or more key indicators to build the core-load prediction model associated for each core group using a machine learning technique; and
transmitting the core-load prediction model of the each core group to the network node.

According to an example embodiment, the method may further comprise, prior to determining the estimated core-load data for each core group using the associated core-load prediction model:
training a core-load and frequency relationship model to be utilized to increase a current processor frequency to an optimum frequency for which the estimated core-load data becomes less than an upper threshold limit, when the estimated core-load data is above the upper threshold limit and to decrease the current processor frequency to the optimum frequency for which the estimated core-load data remains less than the upper threshold limit, when the estimated core-load data is below a lower threshold limit.

According to an example embodiment the each core group of the plurality of core groups in the multi-core processor comprises of one or more processor cores used by an application.

According to an example embodiment, key indicators may include average core-load data, individual core-load data, a downlink throughput data, an uplink throughput data, an average downlink throughput data, and an average uplink throughput data.

According to an example embodiment, the method may further comprise:
scaling a current multi-core processor frequency of the multi-core processor to the optimum multi-core processor frequency.

According to an example embodiment, the scaling the current multi-core processor frequency may be performed by changing the current multi-core processor frequency in steps of one frequency level each time or by changing the current multi-core processor frequency in steps of multiple frequency levels each time.

According to an example embodiment, the method may further comprise:
detecting an unexpected core-load in at least one of the core group of the plurality of core groups based on at least one of current core-load data, memory buffer data, and network traffic data; and
scaling a current multi-core processor frequency of the multi-core processor to a maximum multi-core processor frequency upon detecting the unexpected core-load.

According to an example embodiment, the unexpected core-load may be detected when at least one of the current core-load data, the memory buffer data, and the network traffic data increase from their previous value is above an associated pre-configured threshold value.

according to an example embodiment, a system for dynamic frequency scaling of a multi-core processor in a wireless communication network, may comprise:
a network node comprising:
at least one processor, comprising processing circuitry; and
a memory communicatively coupled to at least one processor, wherein the memory stores processor-executable instructions, wherein at least one processor, individually and/or collectively, may be configured to:

transmit core-load data and a plurality of key indicators of each core group of a plurality of core groups in the multi-core processor to a central management entity (CME);

receive a core-load prediction model associated for each core group from the CME in response to the transmission;

determine an estimated core-load data for each core group using the associated core-load prediction model;

determine a maximum estimated core-load data among the estimated core-load data of each core group; and determine an optimum multi-core processor frequency for the network node based on the maximum estimated core-load data.

According to an example embodiment, the system may include:

a CME communicatively coupled to the network node and configured to:

receive the core-load data and the plurality of key indicators of each core group of the plurality of core groups in the multi-core processor from the network node;

determine associated one or more key indicators from the plurality of key indicators of each core group of the plurality of core groups for predicting future core-load data in the multi-core processor using a feature selection technique in machine learning;

learn relationship between the future core-load data for the each core group of the plurality of core groups and the associated one or more key indicators to build the core-load prediction model associated for each core group using a machine learning technique; and transmit the core-load prediction model of the each core group to the network node.

According to an example embodiment, prior to determining the estimated core-load data for each core group using the associated core-load prediction model, the network node may be configured to:

train a core-load and frequency relationship model to be utilized to increase a current processor frequency to an optimum processor frequency for which the maximum estimated core-load data becomes less than an upper threshold limit, when the estimated core-load data is above the upper threshold limit and to decrease the current core group frequency to the optimum core group frequency for which the maximum estimated core-load data remains less than the upper threshold limit, when the estimated core-load data is below a lower threshold limit.

According to an example embodiment, each core group of the plurality of core groups in the multi-core processor comprises of one or more processor cores used by an application.

According to an example embodiment, key indicators comprise average core-load data, individual core-load data, a downlink throughput data, an uplink throughput data, an average downlink throughput data, and an average uplink throughput data.

According to an example embodiment, the network node is configured to:

scale a current multi-core processor frequency of the multi-core processor to the optimum multi-core processor frequency.

According to an example embodiment, the scaling the current multi-core processor frequency is performed by changing the current multi-core processor frequency in steps of one frequency level each time or by changing the current multi-core processor frequency in steps of multiple frequency levels each time.

According to an example embodiment, the network node is configured to:

detect an unexpected core-load in at least one of the core group of the plurality of core groups based on at least one of current core-load data, memory buffer data, and network traffic data; and scale a current multi-core processor frequency of the multi-core processor to a maximum multi-core processor frequency upon detecting the unexpected core-load.

According to an example embodiment, the unexpected core-load may be detected when at least one of the current core-load data, the memory buffer data, and the network traffic data increase from their previous value is above an associated pre-configured threshold value.

According to an example embodiment, the current core-load data of a highest loaded core in the core-group among the plurality of cores in core group may be considered for deciding the optimum multi-core processor frequency instead of estimated core-load using core-load prediction model.

With respect to the use of substantially any plural and singular terms herein, those having skill in the art may translate from the plural to the singular and from the singular to the plural as is appropriate to the context or application. The various singular or plural permutations may be expressly set forth herein for sake of clarity.

One or more computer-readable storage media may be utilized in implementing embodiments consistent with the disclosure. A computer-readable storage medium refers to any type of physical memory on which a software (program) readable by an information processing apparatus may be stored. The information processing apparatus includes a processor and a memory, and the processor executes a process of the software. Thus, a computer-readable storage medium may store instructions for execution by one or more processors, including instructions for causing the processor(s) to perform steps or stages consistent with the various example embodiments described herein. The term "computer-readable medium" should be understood to include tangible items and exclude carrier waves and transient signals, e.g., be non-transitory. Examples include RAM, ROM, volatile memory, non-volatile memory, hard drives, CD ROMs, DVDs, flash drives, disks, and any other known physical storage media.

The described operations may be implemented as a method, a system, or an article of manufacture using at least one of standard programming and engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media include all computer-readable media except for a transitory. The code implementing the described operations may further be implemented in hardware logic (e.g., an integrated circuit chip, PGA, ASIC, etc.).

The terms "an embodiment", "embodiment", "embodiments", "the embodiment", "the embodiments", "one or more embodiments", "some embodiments", and "one embodiment" may refer, for example, to "one or more (but not all) embodiments of the disclosure(s)" unless expressly specified otherwise.

The terms "including", "comprising", "having" and variations thereof may include "including but not limited to", unless expressly specified otherwise.

The enumerated listing of items does not imply that any or all of the items are mutually exclusive, unless expressly specified otherwise.

The terms "a", "an" and "the" may refer, for example, to "one or more", unless expressly specified otherwise.

A description of an embodiment with several components in communication with each other does not imply that all such components are required. A variety of optional components are described to illustrate the wide variety of possible embodiments of the disclosure.

When a single device or article is described herein, it will be readily apparent that more than one device or article (whether or not they cooperate) may be used in place of a single device or article. Similarly, where more than one device or article is described herein (whether or not they cooperate), it will be readily apparent that a single device or article may be used in place of the more than one device, or article, or a different number of devices or articles may be used instead of the shown number of devices or programs. At least one of the functionalities and the features of a device may be alternatively embodied by one or more other devices which are not explicitly described as having such functionality or features. Thus, various embodiments of the disclosure need not include the device itself.

The illustrated operations of FIGS. 3A and 3B illustrate various events occurring in a certain order. In various embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

The language used in the disclosure has been principally selected for readability and instructional purposes, and it may not have been selected to delineate or circumscribe the disclosed subject matter. It is therefore intended that the scope of the disclosure not be limited by this detailed description. Accordingly, the disclosure of the various example embodiments of the disclosure is intended to be illustrative, not limiting, of the scope of the disclosure, including the appended claims and their equivalents.

While various aspects and embodiments have been disclosed herein, other aspects and embodiments will be apparent to those skilled in the art. The various aspects and embodiments disclosed herein are for purposes of illustration and are not intended to be limiting. It will also be understood that any of the embodiment(s) described herein may be used in conjunction with any other embodiment(s) described herein.

What is claimed is:

1. A method for dynamic frequency scaling of a multi-core processor in a wireless communication network, the method comprising:

transmitting, by a network node, core-load data and a plurality of key indicators of each core group of a plurality of core groups in the multi-core processor to a central management entity (CME);

receiving, by the network node, a core-load prediction model associated for the each core group from the CME in response to the transmission, the core-load prediction model being determined based on the core-load data and the plurality of key indicators of the each core group;

determining, by the network node, an estimated core-load data for the each core group based on the plurality of key indicators of each core group using the associated core-load prediction model;

determining, by the network node, a maximum estimated core-load data among the estimated core-load data of each core group; and determining, by the network node, a multi-core processor frequency for the network node based on the maximum estimated core-load data.

2. The method as claimed in claim 1, wherein associated one or more key indicators from the plurality of key indicators of the each core group is determined for predicting future core-load data in the multi-core processor using a feature selection technique in machine learning, wherein a relationship between the future core-load data for the each core group and the associated one or more key indicators is learned to build the core-load prediction model associated for each core group using a machine learning technique.

3. The method as claimed in claim 1, wherein prior to determining the estimated core-load data for each core group based on the plurality of key indicators of each core group using the associated core-load prediction model, the method further comprising:

training a core-load and frequency relationship model to be utilized to increase a current processor frequency to an optimum frequency for which the estimated core-load data becomes less than an upper threshold limit, based on the estimated core-load data being above the upper threshold limit and to decrease the current processor frequency to the optimum frequency for which the estimated core-load data remains less than the upper threshold limit, based on the estimated core-load data being below a lower threshold limit.

4. The method as claimed in claim 1, wherein the each core group of the plurality of core groups in the multi-core processor comprises of one or more processor cores used by an application.

5. The method as claimed in claim 1, wherein the plurality of key indicators comprise at least one of average core-load data, individual core-load data, a downlink throughput data, an uplink throughput data, an average downlink throughput data, and an average uplink throughput data.

6. The method as claimed in claim 1, further comprising:
   scaling a current multi-core processor frequency of the multi-core processor to the determined multi-core processor frequency.

7. The method as claimed in claim 6, wherein the scaling the current multi-core processor frequency comprises changing the current multi-core processor frequency in steps of one frequency level each time or by changing the current multi-core processor frequency in steps of multiple frequency levels each time.

8. The method as claimed in claim 1, further comprising:
   detecting an unexpected core-load in at least one of the core group of the plurality of core groups based on at least one of current core-load data, memory buffer data, and network traffic data; and scaling a current multi-core processor frequency of the multi-core processor to a maximum multi-core processor frequency based on detecting the unexpected core-load.

9. The method as claimed in claim 8, wherein the unexpected core-load is detected based on at least one of the current core-load data, the memory buffer data, and the network traffic data increasing from a previous value being above an associated specified threshold value.

10. A network node for dynamic frequency scaling of a multi-core processor in a wireless communication network, comprising:

at least one processor comprising processing circuitry; and a memory communicatively coupled to at least one processor, wherein the memory stores processor-executable instructions, and at least one processor, individually and/or collectively, is configured to:

transmit core-load data and a plurality of key indicators of each core group of a plurality of core groups in the multi-core processor to a central management entity (CME);

receive a core-load prediction model associated for the each core group from the CME in response to the transmission, the core-load prediction model being determined based on the core-load data and the plurality of key indicators of the each core group;

determine an estimated core-load data for the each core group based on the plurality of key indicators of each core group using the associated core-load prediction model;

determine a maximum estimated core-load data among the estimated core-load data of each core group; and determine a multi-core processor frequency for the network node based on the maximum estimated core-load data.

11. The network node as claimed in claim 10, wherein:

associated one or more key indicators from the plurality of key indicators of the each core group is determined for predicting future core-load data in the multi-core processor using a feature selection technique in machine learning, wherein a relationship between the future core-load data for the each core group and the associated one or more key indicators is learned to build the core-load prediction model associated for each core group using a machine learning technique.

12. The network node as claimed in claim 10, wherein prior to determining the estimated core-load data for each core group based on the plurality of key indicators of each core group using the associated core-load prediction model, the network node is configured to:

train a core-load and frequency relationship model to be utilized to increase a current processor frequency to an optimum processor frequency for which the maximum estimated core-load data becomes less than an upper threshold limit, based on the estimated core-load data being above the upper threshold limit and to decrease the current core group frequency to the optimum core group frequency for which the maximum estimated core-load data remains less than the upper threshold limit, based on the estimated core-load data being below a lower threshold limit.

13. The network node as claimed in claim 10, wherein the each core group of the plurality of core groups in the multi-core processor comprises of one or more processor cores used by an application.

14. The network node as claimed in claim 10, wherein the plurality of key indicators comprise at least one of average core-load data, individual core-load data, a downlink throughput data, an uplink throughput data, an average downlink throughput data, and an average uplink throughput data.

15. The network node as claimed in claim 10, wherein the at least one processor is configured to:

scale a current multi-core processor frequency of the multi-core processor to the determined multi-core processor frequency.

16. The network node as claimed in claim 15, wherein the scaling the current multi-core processor frequency comprises changing the current multi-core processor frequency in steps of one frequency level each time or by changing the current multi-core processor frequency in steps of multiple frequency levels each time.

17. The network node as claimed in claim 10, wherein the at least one processor is configured to:

detect an unexpected core-load in at least one of the core group of the plurality of core groups based on at least one of current core-load data, memory buffer data, and network traffic data; and scale a current multi-core processor frequency of the multi-core processor to a maximum multi-core processor frequency based on detecting the unexpected core-load.

18. The network node as claimed in claim 17, wherein the unexpected core-load is detected based on at least one of the current core-load data, the memory buffer data, and the network traffic data increasing from a previous value being above an associated specified threshold value.

19. The network node as claimed in claim 17, wherein the current core-load data of a highest loaded core in the core-group among the plurality of cores in core group is used to decide the multi-core processor frequency.

20. One or more non-transitory computer-readable storage media storing computer-executable instructions that, when executed by at least one processor of a network node, cause the network node to perform operations, the operations comprising:

transmitting core-load data and a plurality of key indicators of each core group of a plurality of core groups in the multi-core processor to a central management entity (CME);

receive a core-load prediction model associated for the each core group from the CME in response to the transmission, the core-load prediction model being determined based on the core-load data and the plurality of key indicators of the each core group;

determining an estimated core-load data for the each core group based on the plurality of key indicators of each core group using the associated core-load prediction model;

determine a maximum estimated core-load data among the estimated core-load data of each core group; and determining a multi-core processor frequency for the network node based on the maximum estimated core-load data.

* * * * *